April 7, 1970 M. R. SCHOTT 3,504,406
LATCH

Filed March 18, 1968 3 Sheets-Sheet 1

United States Patent Office 3,504,406
Patented Apr. 7, 1970

3,504,406
LATCH
Marcel René Schott, Columbes, France, assignor, by mesne assignments, to Société Nationale d'Etude et de Construction de Moteurs d'Aviation, Paris, France, a corporation of France
Filed Mar. 18, 1968, Ser. No. 713,729
Claims priority, application France, Mar. 22, 1967, 99,816
Int. Cl. A44b *19/00*
U.S. Cl. 24—230                                    9 Claims

ABSTRACT OF THE DISCLOSURE

The latch mechanism comprises a retaining member adapted to co-operate with a latching finger of the load to be latched, a locking unit for locking and releasing the retaining member, and principal control means for causing the passage of the locking unit from an active position to a normal release position. The locking unit comprises a toggle joint having two arms angularly blocked at their vertex by a blocking system that can be released under the action of emergency releasing means.

---

The present invention relates, in a general manner, to latch mechanisms which comprise a pivotable retaining member controllable at will and adapted to co-operate with a load, this retaining member being able to occupy either an active position, in which it prevents the displacement of the load in a determined direction, or a release position, in which it permits the displacement of the load in that determined direction.

The invention is more particularly, but not exclusively, concerned with latch mechanisms of this type that are intended for aeronautical and/or aerospatial applications, in particular latch mechanisms for locking aircraft undercarriages in their retracted position; such latch mechanisms must be of extremely dependable operation.

The chief object of this invention is to provide latch mechanisms of this type that fulfill the requirements of practice, in particular with respect to their dependability of operation.

A latch mechanism according to the present invention comprises:

A retaining member mounted pivotably about a first axle rigid with a fixed structure of the mechanism and adapted to co-operate with the load to be latched, said retaining member being provided with an abutment surface, A locking unit mounted pivotably about a second axle rigid with a fixed structure of the mechanism, said locking unit being provided with a bearing element arranged in a manner to be able to co-operate with the abutment surface of the retaining member, and Principal control means for causing the passage of the locking unit, by pivoting of this locking unit about the second axle, from an active position (in which the bearing element is maintained in abutment against the abutment surface) to a normal release position (in which the bearing element allows the abutment surface to escape), and inversely, and This latch mechanism is characterized by the fact that the locking unit comprises a toggle joint having two branches, one of which is articulated on the second axle and the other of which carries the bearing element, these two branches being angularly blocked at the vertex of this toggle joint by a blocking system carried by one of the two branches of the toggle joint, this blocking system being adapted to be released under the action of emergency releasing means for angularly unblocking the two branches, which will cause, in particular under the effect of the reaction exerted by the abutment surface of the retaining member on the bearing element of the locking unit, a relative pivoting of the two branches about the vertex of the toggle joint, which relative pivoting will permit the locking unit to pass from its active position (in which the bearing element is maintained in abutment against the abutment surface) to an exceptional release position (in which the bearing element allows the abutment surface to escape), this manoeuvre being thus effected without the intervention of the principal control means, due to which it will be possible, if the principal control means, which in normal operating conditions cause the normal release of the locking unit, become accidentally inoperative, to act on the emergency releasing means which will then cause the exceptional release of the locking unit.

The invention will be easily understood from the following description of a preferred embodiment of a latch mechanism, given merely by way of example, with reference to the accompanying drawings, in which.

Figure 1:
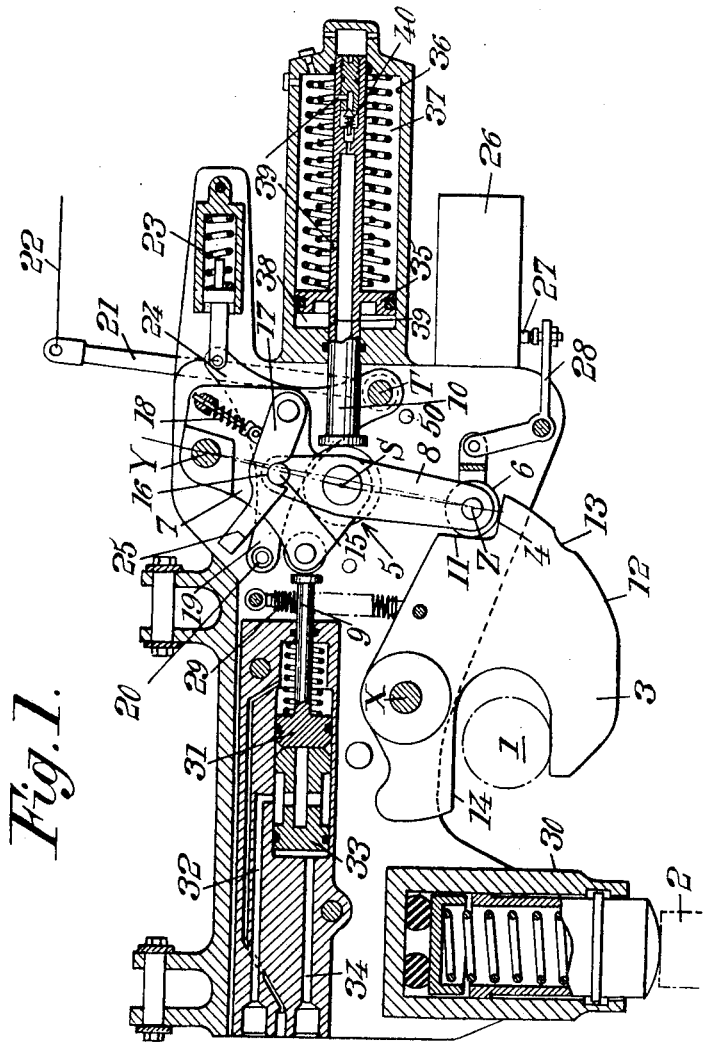
FIGURE 1 shows a longitudinal section of a latch mechanism constructed according to the invention, this latch mechanism being represented in its active position.

The latch mechanism shown in the drawings is intended for locking aircraft undercarriages in their retracted position.

It is known that lach mechanisms for locking aircraft undercarriages in their retracted position, in particular for subsonic or supersonic commercial aircraft, must be extremely dependable in operation.

Figure 2:
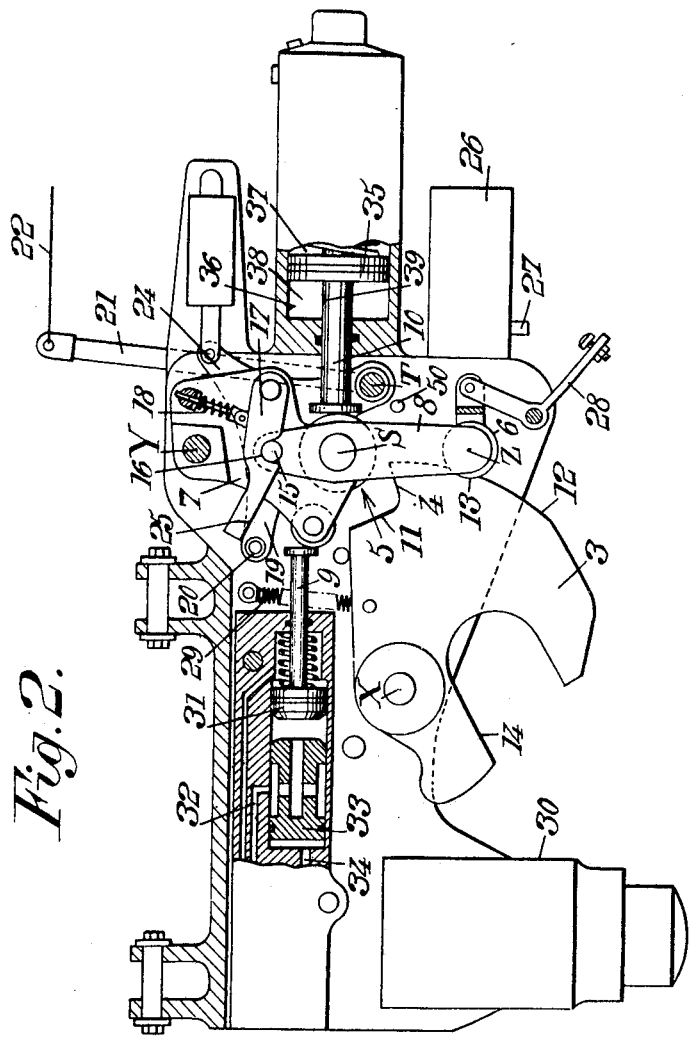
FIGURE 2 shows, in the same conditions as FIGURE 1, the same latch mechanism but represented in its released position.

FIGURES 1 and 2 show a latch mechanism for locking an aircraft undercarriage (the right or left principal undercarriage or the front undercarriage), this undercarriage being represented, in these figures, only by its latching finger 1 and by its abutment member 2 which will be more explicitly described hereinatfer.

This latch mechanism comprises:

A retaining member 3 mounted pivotably about a first axle X rigid with a fixed structure of the latch mechanism and adapted to co-operate with the latching finger 1 of the undercarriage, this retaining member 3 being provided with an abutment surface 4, A locking unit 5 mounted pivotably about a second axle Y rigid with a fixed structure of the latch mechanism, this locking unit 5 being provided with a bearing element 6 arranged in a manner to be able to co-operate with the abutment surface 4 of the retaining member 3, and Principal control means for causing the passage of the locking unit 5, by pivoting of this locking unit 5 about the second axle Y, from an active position (in which the bearing element 6 is maintained in abutment against the abutment surface 4) to a normal release position (in which the bearing element 6 allows the abutment surface 4 to escape) and inversely.

In accordance with the principal feature of the invention, the locking unit 5 comprises a toggle joint having two branches joined together at a vertex S, one of these branches (the first branch 7 in the present embodiment) being articulated on the second axle Y, and the other branch (the second branch 8) carrying the bearing element 6, these two branches 7 and 8 being angularly blocked at the vertex S of this toggle joint by a blocking system carried by one of the two branches of this toggle joint, which blocking system can be released under the action of emergency releasing means for angularly unblocking these two branches 7 and 8, which will cause, in particular under the effect of the reaction exerted by the abutment surface 4 of the retaining member 3 on the bearing element 6 of the locking unit 5, a relative pivoting of the two branches 7 and 8 about the vertex S of the toggle joint, which relative pivoting will finally permit the locking unit 5 to pass from its active position (in which the bearing element 6 is maintained in abutment against the abutment surface 4) to an exceptional release position (in which the bearing element 6 allows the abutment surface 4 to escape), this manoeuvre being thus effected without the intervention of the principal control means.

It will thus be possible, if the principal control means, which in normal operating conditions cause the normal release of the locking unit 5, become accidentally inoperative, to act on the emergency releasing means which will then cause the exceptional release of the locking unit 5, so that the undercarriage can then be lowered.

In the embodiment illustrated in FIGURES 1 and 2, the principal control means for causing the passage of the locking unit 5 from its active position to its normal release position, and inversely, comprise, A single acting hydraulic jack 9 arranged so that, when it is supplied with liquid under pressure, it acts on the locking unit 5 in the sense that makes this locking unit 5 pass from its active position to its release position, and A spring actuated push piece 10 acting in opposition with respect to the hydraulic jack 9 so that, when this hydraulic jack 9 is no longer supplied with liquid under pressure, the push piece 10 acts on the locking unit 5 in the sense that tends to return this locking unit 5 from its release position to its active position, this active position being able to be taken as soon as the abutment surface 5 is located at the level of the bearing element 6.

The bearing element 6 carried by the branch 8 of the toggle joint forming the locking unit 5 can then advantageously comprise a roller mounted freely in rotation about a third axle Z rigid with this branch 8.

The retaining member 3 is preferably in the form of a hook provided, a well as with its abutment surface 4, with a shoulder 11 against which the bearing element 6 is applied by the push piece 10 (FIGURE 1).

In addition, this hook has a first ramp 12 on which rolls the roller forming the bearing element 6 when this bearing element 6 has allowed the abutment surface 4 to escape; this ramp 12 advantageously comprises a depression 13 in which this roller engages when the hook in question occupies its release position in which the hooking finger 1 of the undercarriage can be disengaged, this roller then contributing to holding the hook in this position (FIGURE 2).

This hook advantageously comprises a second ramp 14 against which the latching finger 1 of the undercarriage abuts, the orientation and the disposition of this second ramp 14 with respect to the first axle X being such that the action of the latching finger 1 on this second ramp 14 brings the hook into its latched position in which the latcing finger 1 of the undercarriage can no longer be disengaged (FIGURE 1).

Figure 3:
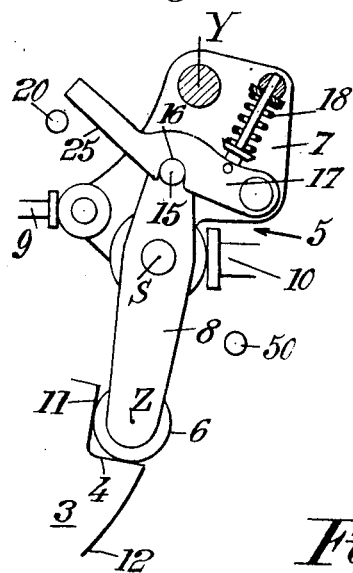
FIGURE 3 represents a front view of an important element of the latch mechanism shown in FIGURES 1 and 2, the constituent pieces of this element being shown in a position corresponding to the active position of the latch mechanism.

With respect to the two branched toggle joint forming the locking unit 5, it is advantageous to arrange this toggle joint, as shown in FIGURES 1, 2 and 3, so that, when these branches are angularly blocked, the angle defined by the line joining the vertex S of the toggle joint to the second axle Y and the line joining the vertex S of the toggle joint to the third axle Z is:

On the one hand, open towards the spring actuated push piece 10, and

On the other hand, slightly less than 180°, and preferably less than 170°.

In other words, the toggle joint is arranged so that its vertex S is situated, with respect to the line joining the second axle Y and the third axle Z, on the side of the line towards the hydraulic jack 9.

This particular arrangement of the toggle joint is very advantageous for it will be appreciated that, as soon as the releasing means causing the unblocking of the blocking system are actuated, the reaction exerted by the abutment surface 4 on the bearing element 6, and the force exerted by the spring actuated push piece 10, will immediately cause the "breaking" of the toggle joint and, consequently, the passage of the locking unit 5 thus formed from its active position to its exceptional release position. This exceptional position is clearly shown in FIGURES 4 and 5 in which the same reference characters designate the same members as in the preceding figures.

So far, nothing has been said concerning the construction of the blocking system for the two branches 7 and 8 of the toggle joint forming the locking unit 5. Although this blocking system can be formed in several manners, the blocking system shown in the embodiment illustrated in the drawings seems to be preferable.

According to this embodiment, the blocking system comprises a lug 15 rigid with the second branch 8 of the toggle joint which carries the bearing element 6, this lug 15 being disposed in a manner to be able to engage in a notch 16 formed in a lever 17 mounted pivotably on the first branch 7 of the toggle joint which is articulated on the second axle Y.

Preferably, a return spring 18 is provided for maintaining the lever 17 in engagement with the lug 15.

In these conditions, the emergency releasing means for such a blocking system can advantageously comprise an arm 19 mounted pivotably about a fourth axle T rigid with a fixed structure of the mechanism, this arm 19 carrying a finger 20 disposed in a manner to be able to co-operative with the lever 17 to cause this lever 17 to release the lug 15.

This arm 19 is then actuated by a releasing lever 21 angularly rigid with the arm 19, and adapted to be manoeuvred, for example, by a cable 22 leading to the cockpit of the aircraft, a return spring 23, acting on an extension 24 of the arm 19, being then provided for returning the arm 19 and maintaining the cable 22 under tension.

Figure 4:
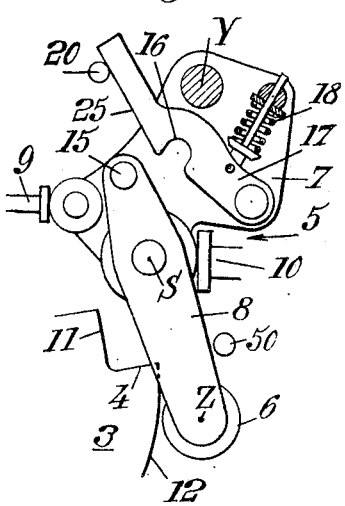
FIGURE 4 represents, in the same conditions as FIGURE 3, the same element whose constituent pieces are shown in a position corresponding to the release position of the latch mechanism.
Figure 5:
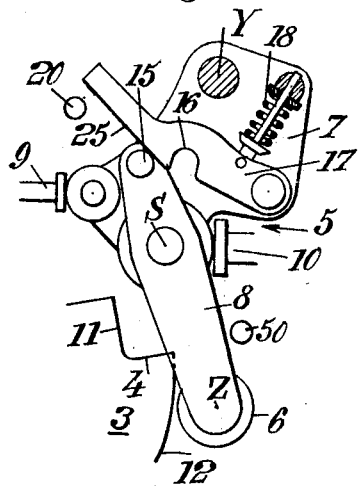
FIGURE 5 represents, in the same conditions as FIGURE 3, the same element whose constituent pieces are shown in a rest position still corresponding to the release position of the latch mechanism.

Preferably as shown in FIGURES 3, 4 and 5, the lever 17 comprises a ramp 25 adapted to bear against the lug 15 when this lug 15 has been released from the notch 16 and when the emergency releasing means are not actuated; this ramp 25 is disposed so that any force exerted on the locking unit 5 (constructed as has just been described) and directed in the sense which tends to make this locking unit 5 take its "blocked locking unit" configuration, causes the automatic resetting of the blocking system by bringing the lug 15 into engagement in the notch 16.

In this connection, it should be mentioned that the disposition of the hydraulic jack 9, of the spring actuated push piece 10, and of the locking unit 5, is such that, when the locking unit 5 occupies its exceptional release position and when the ramp 25 bears against the lug 15 (FIGURE 5), the automatic resetting of the blocking system can be effected by the hydraulic jack 9, a stop 50 being provided to prevent, during this resetting manoeuvre, any pivoting of the locking unit 5 about the second axle Y.

Finally, various complementary features of the invention are illustrated in FIGURES 1 and 2.

An electric contactor 26 is provided whose control button 27 is actuated by a lever 28 whose angular displacement is controlled by the locking unit 5. This lever 28 can, for example, depress the control button 27 when the locking unit 5 occupies its active position (FIGURE 1)—the electric contactor 26 then giving an indication "undercarriage latched"—and release the control button 27 when the locking unit 5 occupies its normal release position (FIGURE 2) or its exceptional release position—the electric contactor 26 then giving an indication "undercarriage unlatched."

A return spring 29 is provided urging the retaining member 3 in the sense which unlatches the undercarriage, this return spring 29 being principally intended to enable trials of the latch mechanism to be carried out without the undercarriage being really retracted, that is to say in the absence of the latching finger 1.

An elastic stop 30 is provided against which the abutment member 2 bears at the end of the retraction stroke of the undercarriage.

The hydraulic jack 9 comprises two pistons mounted in tandem, namely a first piston 33 actuated by the liquid under pressure of the normal hydraulic circuit 34, and a second piston 31 actuated by the liquid under pressure of the auxiliary hydraulic circuit 32.

Damping means are associated with the spring actuated push piece 10; accordingly the spring actuated push piece comprises a piston 35 sliding in a cylinder 36 and separating two chambers 37 and 38 partially filled with oil, throttling orifices 39 and an anti-return valve 40 being interposed in the passage of the oil from one of these chambers 37 or 38 to the other.

The operation of a latch mechanism constructed as has just been described will now be explained, with reference, first of all to FIGURES 1 and 2 for the normal operation, then to FIGURES 3, 4 and 5 for the exceptional operation.

When the pilot of the aircraft desires to effect the normal manoeuvre of unlatching of the undercarriage, he controls the admission of liquid under pressure into the hydraulic jack 9, either from the normal hydraulic circuit 34, or, in certain cases, from the auxiliary hydraulic circuit 32 (FIGURES 1 and 2). The locking unit 5 then passes from its active position (FIGURE 1) to its normal release position (FIGURE 2). The undercarriage is unlatched and the pilot can effect the manoeuvre of lowering the undercarriage. During the manoeuvre of retracting the undercarriage, the latching finger 1, co-operating with the second ramp 14 of the retaining member 3, causes the pivoting of this retaining member 3 and the spring actuated push piece 10 makes the locking unit 5 pass from its normal release position (FIGURE 2) to its active position (FIGURE 1).

When the pilot of the aircraft realizes that the hydraulic jack 9 has become accidentally inoperative, and desires to effect the exceptional manoeuvre of unlatching the undercarriage, he actuates the emergency releasing means by the intermediary of the cable 22. The locking unit 5 then passes from its normal position (FIGURE 3) to its exceptional release position (FIGURES 4 and 5). The undercarriage is unlatched and the pilot can effect the manoeuvre of lowering the undercarriage. As soon as the hydraulic jack 9 can operate again, the pilot controls the admission of liquid under pressure into the hydraulic jack 9, which causes the automatic resetting of the blocking system of the locking unit 5 due to the ramp 25 and the stop 50. The manoeuvre of retracting the undercarriage then causes, according to the same process as that described in connection with the normal operation, the pivoting of the retaining member 3.

Regardless of the embodiment adopted, the present invention provides a latch mechanism whose operation is very sure and which presents, in addition, a certain number of advantages among which the following can be mentioned:

Simplicity of construction,

Considerable decrease in the risk of breakdown,

Emergency releasing means only requiring a very small amount of energy,

Possibility of carrying out trials of the mechanism, in all the cases of operation, without manual intervention since the resetting of the blocking system is automatic.

Although the latch mechanism according to the present invention is particularly suitable for latching an aircraft undercarriage in its retracted position, this latch mechanism can be used in various other applications, such as, for example, loading or unloading goods, holding pivotable constructions in a certain position (launching ramps, lift-bridges, handling equipment, etc.).

Furthermore, various modifications are possible to the construction of the latch mechanism itself, without departing from the spirit or scope of the present invention.

What I claim is:

1. A latch mechanism for latching and unlatching for respectively preventing and permitting the displacement of a load in a determined direction, this latch mechanism comprising, a retaining member mounted pivotably about a first axle rigid with a fixed structure, said retaining member being able to occupy an active position in which it prevents the displacement of the load and a release position in which it permits the displacement of the load, said retaining member being provided with an abutment surface, a locking unit mounted pivotably about a second axle rigid with a fixed structure, said locking unit being provided with a bearing element arranged in a manner to be able to co-operate with the abutment surface of the retaining member, and principal control means for causing the passage of the locking unit, by pivoting of said locking unit about the second axle, from an active position, in which the bearing element is maintained in abutment against the abutment surface, to a normal release position, in which the bearing element allows the abutment surface to escape, and inversely, said locking unit comprising a toggle joint having two branches joined together at a vertex, one of said branches being articulated about said second axle, and the other branch carrying said bearing element, these two branches being angularly blocked at the vertex of this toggle joint by a blocking system carried by one of the two branches of said toggle joint, said blocking system being adapted to be released under the action of emergency releasing means for angularly unblocking said two branches, which causes, in particular under the reaction effect exerted by the abutment surface of the retaining member on the bearing element of the locking unit, a relative pivoting of the two branches about the vertex of the toggle joint, which relative pivoting permits the locking unit to pass from its active position, in which the bearing element is maintained in abutment against the abutment surface, to an exceptional release position, in which the bearing element allows the abutment to escape, this manoeuvre being thus effected without the intervention of the principal control means.

2. A latch mechanism according to claim 1, wherein said principal control means comprise, a single-acting hydraulic jack arranged so that, when it is supplied with liquid under pressure, it acts on the locking unit in the sense that makes this locking unit pass from its active position to its normal release position, and a spring actuated push piece acting in opposition with respect to the hydraulic jack so that, when said hydraulic jack is no longer supplied with liquid under pressure, the push piece acts on the locking unit in the sense which tends to return said locking unit from its normal release position to its active position, said active position being able to be taken as soon as the abutment surface is located at the level of the bearing element.

3. A latch mechanism according to claim 2, wherein said toggle joint having two branches is arranged so that the angle defined by its two branches when they are angularly blocked is, on the one hand, open towards the spring actuated push piece, and on the other hand, slightly less than 180°.

4. A latch mechanism according to claim 3, wherein said angle is slightly less than 170°.

5. A latch mechanism according to claim 3, wherein said blocking system comprises a lug rigid with the branch of the toggle joint that carries the bearing element, said lug being disposed in a manner to be able to engage in a notch formed in a lever mounted pivotably on the branch of the toggle joint that is articulated on said second axle, a return spring being provided to maintain normally said lever in engagement with said lug.

6. A latch mechanism according to claim 5, wherein said emergency releasing means comprise an arm mounted pivotably about a further axle rigid with a fixed structure of the mechanism, said arm carrying a finger disposed in a manner to be able to co-operate with said lever to cause said lever to release said lug.

7. A latch mechanism according to claim 6, wherein said arm is actuated by a releasing lever angularly rigid with said arm, and adapted to be manoeuvred by the intermediary of a cable, a return spring, acting on an extension of the arm, being provided for returning the arm and maintaining the cable under tension.

8. A latch mechanism according to claim 5, wherein said lever comprises a ramp adapted to bear against said lug when said lug has been released from said notch and when simultaneously said emergency releasing means are not actuated, said lever ramp being disposed so that any force exerted on the locking unit and directed in the sense that tends to make this locking unit take its "blocked locking unit" configuration causes the automatic resetting of the blocking system by bringing said lug into engagement in said notch.

9. A latch mechanism according to claim 8, wherein the disposition of said hydraulic jack, of said spring actuated push piece and of said locking unit is such that when said locking unit occupies its exceptional release position and when simultaneously said lever ramp bears against said lug, the automatic resetting of the blocking system can be effected by said hydraulic jack, a stop being provided to prevent, during this resetting manoeuvre, any pivoting of said locking unit about said second axle.

References Cited

UNITED STATES PATENTS 2,567,114   9/1951   Linn.
3,266,834   8/1966   Lebovitz _____ 294—83

BERNARD A. GELAK, Primary Examiner

U.S. Cl. X.R.

24—241; 244—102; 294—83